United States Patent
Schultz (10) Patent No.: US 11,932,831 B2
(45) Date of Patent: *Mar. 19, 2024

(54) WATER-BASED GRAPHENE DISPERSION MADE BY SHEAR STABILIZATION

(71) Applicant: Turtle Wax, Inc., Addison, IL (US)

(72) Inventor: Michael A. Schultz, Homer Glen, IL (US)

(73) Assignee: TURTLE WAX, INC., Addison, IL (US)

(*) Notice: Subject to any disclaimer, the term of this patent is extended or adjusted under 35 U.S.C. 154(b) by 2 days.

This patent is subject to a terminal disclaimer.

(21) Appl. No.: 17/969,390

(22) Filed: Oct. 19, 2022

(65) Prior Publication Data

US 2023/0039120 A1    Feb. 9, 2023

Related U.S. Application Data

(63) Continuation of application No. 17/862,611, filed on Jul. 12, 2022, now Pat. No. 11,512,265.

(Continued)

(51) Int. Cl.
| | | |
|---|---|---|
| *C11D 3/12* | (2006.01) | |
| *C01B 32/194* | (2017.01) | |
| *C01B 32/225* | (2017.01) | |

(52) U.S. Cl.
CPC .............. *C11D 3/12* (2013.01); *C01B 32/194* (2017.08); *C01B 32/225* (2017.08);
(Continued)

(58) Field of Classification Search
CPC ..... C11D 3/12; C11D 11/0023; C01B 32/194; C01B 32/225; C01B 2204/02;
(Continued)

(56) References Cited

U.S. PATENT DOCUMENTS

| | | |
|---|---|---|
| 4,919,305 A | 4/1990 | Podgers |
| 11,512,265 B1 * | 11/2022 | Schultz .................. C11D 3/12 |

(Continued)

FOREIGN PATENT DOCUMENTS

WO     2021003565     1/2021

OTHER PUBLICATIONS

BRANDT® Super Wetter, accessed online at https://brandt.co/media/4197/brandt-super-wetter-brochure.pdf on Sep. 14, 2022 (Year: 2022).*

(Continued)

*Primary Examiner* — Daniel C. McCracken
(74) *Attorney, Agent, or Firm* — K&L Gates LLP (57) ABSTRACT

A water-based graphene dispersion is made by shear stabilization. The method of preparing the water-based graphene dispersion using shear stabilization includes adding a composition containing a graphene powder, a super wetter surfactant and a water dispersible rheology agent into water to form an aqueous mixture; and shearing the aqueous mixture under high pressures to break down the thick layers of the graphene powder to thin layers of graphene platelet particles and to form the water-based graphene dispersion with the graphene platelet particles dispersed in the water-based graphene dispersion. The water-based graphene dispersion is stable without visible phase separation after storage at room temperature for at least one year or even more than one year.

22 Claims, 2 Drawing Sheets

Related U.S. Application Data (60) Provisional application No. 63/225,092, filed on Jul. 23, 2021.

(52) U.S. Cl.
CPC ...... *C01B 2204/02* (2013.01); *C01B 2204/04* (2013.01); *C01B 2204/32* (2013.01); *C01P 2004/24* (2013.01); *C01P 2004/50* (2013.01); *C11D 2111/14* (2024.01)

(58) Field of Classification Search
CPC ............ C01B 2204/04; C01B 2204/32; C01B 32/182; C01B 32/184; C01B 32/186; C01B 32/188; C01B 32/19; C01B 32/192; C01B 32/196; C01B 32/198; C01B 2204/00; C01B 2204/06; C01B 2204/065; C01B 2204/20; C01B 2204/22; C01B 2204/24; C01B 2204/26; C01B 2204/28; C01B 2204/30; C01B 32/20; C01B 32/205; C01B 32/21; C01B 32/215; C01B 32/22; C01B 32/23; C01P 2004/24; C01P 2004/50; C01P 2004/20
See application file for complete search history.

(56) References Cited

U.S. PATENT DOCUMENTS

| | | | |
|---|---|---|---|
| 2013/0107370 A1* | 5/2013 | Lander | C03C 3/087 359/609 |
| 2015/0237851 A1* | 8/2015 | Drew | A01N 25/10 524/265 |
| 2016/0038628 A1* | 2/2016 | Klofta | A61L 15/26 436/39 |
| 2016/0115293 A1 | 4/2016 | Aksay et al. | |
| 2017/0059117 A1 | 3/2017 | Lee et al. | |
| 2017/0096344 A1 | 4/2017 | Green et al. | |
| 2017/0158512 A1 | 6/2017 | Sohn et al. | |
| 2017/0166449 A1 | 6/2017 | Yoo et al. | |
| 2018/0102543 A1 | 4/2018 | Su et al. | |
| 2018/0215622 A1 | 8/2018 | Yoo et al. | |
| 2018/0269465 A1 | 9/2018 | Hirai et al. | |
| 2018/0312404 A1 | 11/2018 | Karagiannidis et al. | |
| 2019/0366353 A1 | 10/2019 | Ladislaus | |
| 2020/0122108 A1 | 4/2020 | Kim et al. | |
| 2020/0255293 A1 | 8/2020 | Ladislaus | |
| 2021/0135209 A1 | 5/2021 | Hayner et al. | |
| 2021/0348004 A1* | 11/2021 | Sakai | B05D 5/06 |

OTHER PUBLICATIONS

Organosilicone Super Wetters, accessed online at https://www.lovelandproducts.com/organosilicone-super-wetters on Sep. 14, 2022 (Year: 2022).*

Silicone Super Wetter, accessed online at https://assets.greenbook.net/L100100.pdf on Sep. 14, 2022 (Year: 2022).*

Evonik Press Release—Superwetting surfactants with good foam control properties, accessed online at https://www.coating-additives.com/en/superwetting-surfactants-with-good-foam-control-properties-109313.html (Mar. 6, 2019) (Year: 2019).*

Trademark Reg. No. 1,042,021 to Union Carbide Corporation for the mark "UCAR Super Wetter FP" (Year: 2022).*

How to satisfy a disclaimer requirement, accessed online at https://www.uspto.gov/trademarks/laws/how-satisfy-disclaimer-requirement on Sep. 14, 2022 (Year: 2022).*

International Searching Authority for International application No. PCT/US 22/37153 dated Sep. 19, 2022.

Trademark Reg. No. 1,042,021 to Union Carbide Corporation (Year: 1976).

International Written Opinion of International Application No. PCT/US 22/37153 dated Nov. 30, 2022.

International Search Report of International Application No. PCT/US 22/37153 dated Nov. 30, 2022.

\* cited by examiner

WATER-BASED GRAPHENE DISPERSION MADE BY SHEAR STABILIZATION

PRIORITY CLAIMS

The application is a continuation of U.S. patent application Ser. No. 17/862,611 filed Jul. 12, 2022, which claims the benefit of priority to U.S. Provisional Application No. 63/225,092 filed Jul. 23, 2021, the entire disclosure of which is hereby incorporated by reference.

TECHNICAL FIELD

The present disclosure generally relates to a water-based graphene dispersion made by high pressure shear exfoliation and stabilization and a method of making the same.

BACKGROUND

Graphite (FIG. 1) is a stack of graphene sheets bound by van der Waals interactions, each graphene layer being made of $sp^2$ carbons distributed in a hexagonal crystal structure. Graphene has shown superior mechanical, electrical, and thermal properties.

Figure 1:
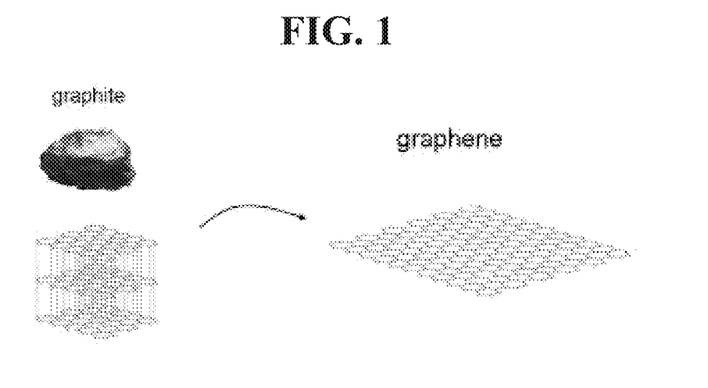
FIG. 1 shows a single layer of graphene in relation to graphite.

In "bottom-up" methods to produce graphene, for example, chemical vapour deposition (CVD), graphene is synthesized. In "top-down" methods, for example liquid-phase exfoliation, graphene sheets are separated from bulk graphite material (FIG. 1). The "bottom-up" approach produces low quantities with high quality and large flakes. The "top-down" approach using graphite is low in cost and yields a high concentration of suspended flakes, but fabricates limited-size sheets with a low yield of mono-layer graphene. Existing commercially available graphene products usually contains precipitates of graphene due to the presence of thick layers of graphene and are not stable.

SUMMARY

The present disclosure provides a water-based graphene dispersion and a method of preparing the same by shear stabilization. Applicant surprisingly found that by shearing an aqueous dispersion of a unique combination of ingredients comprising a graphene powder, a surfactant, a water dispersible rheology agent and water under high shear pressures and forces, a water-based graphene dispersion can be achieved with graphene platelet particles having fewer layers of graphene dispersed evenly and homogeneously in the water-based graphene dispersion. Applicant surprisingly found that the resultant water-based graphene dispersion can be stable without visible phase separation after storage at room temperature for at least one week, at least one year or even more than one year.

One aspect of the present disclosure provides a method of preparing a water-based graphene dispersion using shear stabilization, the method comprising: providing water; adding a composition comprising a graphene powder, a super wetter surfactant and a water dispersible rheology agent into the water to form an aqueous mixture; and shearing the aqueous mixture to form the water-based graphene dispersion with graphene platelet particles dispersed in the water-based graphene dispersion. In an embodiment, the water may be DI water.

In an embodiment, the method further comprising adding a base neutralizer into the aqueous mixture before, during and/or after shearing the aqueous mixture, preferably after shearing the aqueous mixture to adjust the pH value of the water-based graphene dispersion to be about 2-12, about 3-11, about 4-10, about 5-9, about 6-9, about 7-9, about 6.5-8.5, or preferably about 6.8-7.2. The base neutralizer may be an alkaline chemical, an alkaline base, or an amine neutralizer. In an embodiment, the base neutralizer may be selected from the group consisting of sodium hydroxide (NaOH), potassium hydroxide (KOH), ammonium hydroxide ($NH_3 \cdot H_2O$ or $NH_4OH$), morpholine ($O(CH_2CH_2)_2NH$), and combinations thereof. The base neutralizer is preferably NaOH in an aqueous solution form, such as a 0.001-50% active NaOH aqueous solution.

In an embodiment, the method further comprises adding a preservative to the aqueous mixture before, during and/or after shearing the aqueous mixture, preferably before shearing the aqueous mixture. The preservative may be benzisothiazolinone (BIT), Methylisothiazolinone (MIT), sodium benzoate, sorbic acid, butylated hydroxyanisole (BHA), butylated hydroxytoluene (BHT), nitrites, sulfites, sodium sorbate, potassium sorbate, or combinations thereof. Preferably, the preservative is benzisothiazolinone (BIT). The preservative may be added in an amount of about 0.0001-10 wt. %, about 0.0001-5 wt. %, about 0.0001-1 wt. %, about 0.0005-0.5 wt. %, or preferably about 0.1 wt. %.

In an embodiment, the graphene powder is an agglomerated graphene having an average particle size in a range of about 0.01-1000 micrometer (μall), about 0.1-100 μm, about 0.5-50 μm, about 0.5-20 μm, about 1-20 μm, or about 1-10 μm. In an embodiment, the graphene powder may be selected from the group consisting of an agglomerated graphene, a chemically modified agglomerated graphene, an agglomerated graphene oxide, an agglomerated reduced graphene oxide, an expanded graphite or graphene, a thermally expanded graphite or graphene, a chemically exfoliated graphite or graphene, and combinations thereof. In an embodiment, the graphene powder may be xGnP® C-300, C-500 or C-750 Graphene Nanoplatelets powder from XG Sciences, and preferably xGnP® C-300 Graphene Nanoplatelets powder. The graphene powder is added in an amount of about 0.01-30 wt. %, about 0.05-20 wt. %, about 0.1-20 wt. %, about 0.1-10 wt. %, 0.1-5 wt. %, about 0.5-5 wt. %, preferably about 0.1-10 wt. %, or about 0.3 wt. % of the water-based graphene dispersion.

In an embodiment, the graphene powder has a first number of graphene layers. In an embodiment, the graphene platelet particles dispersed in the water-based graphene dispersion has a second number of graphene layers. In an embodiment, the second number is less than the first number. In an embodiment, the first number of graphene layers of the graphene powder before shearing is on average in a range of about 1-5000, about 10-2000, about 20-1500, about 50-1000, about 50-500 or about 10-100. In an embodiment, the second number of graphene layers of the graphene platelet particles dispersed in the water-based graphene dispersion after shearing is on average in a range of less than about 500, less than about 100, less than about 50, less than about 20, less than about 10, about 1-100, about 1-50, about 1-20, preferably about 1-10, about 1-5, 1-3 or 1-2.

In an embodiment, the graphene platelet particles dispersed in the water-based graphene dispersion have an average thickness less than about 100 nanometer (nm), less than about 50 nm, from about 1 nm to about 100 nm, from about 1 nm to about 50 nm, from about 1 nm to about 20 nm, preferably from about 1 nm to about 10 nm, from about 1 nm to about 5 nm, from 1 nm to about 3 nm, or from 1 nm to 2 nm.

In an embodiment, the graphene platelet particles dispersed in the water-based graphene dispersion have an average lateral size (an average diameter in the plane dimensions) of less than about 50 micrometer (μm), less than about 20 μm, less than about 10 μm, less than about 5 μm, less than about 3 μm, less than about 2 μm, from about 0.1 μm to about 10 μm, from about 0.5 μm to about 5 μm, from about 0.5 μm to about 3 μm, from about 0.1 μm to about 2 μm, or from about 0.5 μm to about 2 μm.

In an embodiment, the graphene platelet particles dispersed in the water-based graphene dispersion have an average surface area of about 10-2,629 $m^2/g$, about 100-2,500 $m^2/g$, about 200-2,000 $m^2/g$, about 300-1,500 $m^2/g$, or about 300-1,000 $m^2/g$.

In an embodiment, the water-based graphene dispersion can be stable without visible phase separation after storage at room temperature for at least 1 hour, 1 day, 1 week, 1 year or even more than 1 year.

In an embodiment, the super wetter surfactant may be a surfactant capable of reducing the surface tension of the aqueous dispersion of the ingredients. In an embodiment, the super wetter surfactant may be an organomodified copolymer that can provide surface tension reduction and superspreading properties to aqueous solutions while remaining stable in formulations from pH 2-12. In an embodiment, the super wetter surfactant is selected from the group consisting of a silicone based super wetter that reduces the surface tension of water, an organomodified copolymer, SILWET™ Hydrostable 212 from Momentive, and combinations thereof. Preferably, the super wetter surfactant can reduce the surface tension in an aqueous solution down between 40-50 mN/m. In an embodiment, the super wetter surfactant is preferably SILWET™ Hydrostable 212.

In an embodiment, the super wetter surfactant is added to the water-based graphene dispersion in an amount capable of reducing the water surface tension from 72 mN/m to about 26.7-65 mN/m, about 30-60 mN/m, or preferably about 40-50 mN/m. In an embodiment, the super wetter surfactant is added in an amount of about 0.01-5.0 wt. %, about 0.05-3.0 wt. %, about 0.05-2.0 wt. %, preferably about 0.05-1.0 wt. %, or about 0.1 wt. % of the water-based graphene dispersion.

In an embodiment, the water dispersible rheology agent is added into the aqueous mixture to facilitate the dispersion of the graphene in the water-based graphene dispersion, and prevent further agglomeration of graphene and to stabilize the water-based graphene dispersion. The water dispersible rheology agent may be selected from the group consisting of a polyacrylic acid polymer powder, a crosslinked polyacrylic acid polymer powder, a hydrophobically-modified crosslinked polyacrylic acid polymer powder, Carbopol® polymers with different crosslinking densities, Carbopol® EZ-2, 3, 4 and 5 polymers from Lubrizol, and combinations thereof, and preferably a hydrophobically-modified crosslinked polyacrylic acid polymer powder or Carbopol® EZ-3. In an embodiment, the water dispersible rheology agent is the polyacrylic acid polymer crosslinked with polyalkenyl polyether or divinyl glycol at different crosslinking densities. In an embodiment, the crosslinking density of the polyacrylic acid polymer is in a range of about 0.01-90%, about 0.01-70%, about 0.01-60%, about 0.01-50%, about 0.05-10%, or preferably about 0.05-4%.

In an embodiment, the water dispersible rheology agent is acidic when it is mixed with water. In an embodiment, the water dispersible rheology agent creates a gel matrix when neutralized with a base neutralizer in the aqueous solution.

In an embodiment, the water dispersible rheology agent is added into the aqueous mixture in an amount of about 0.01-10 wt. %, about 0.01-5 wt. %, about 0.05-5.0 wt. %, about 0.1-3.0 wt. %, about 0.1-3.0 wt. %, about 0.2 wt. %, or preferably about 0.05-4 wt. % of the water-based graphene dispersion.

In an embodiment, the shearing of the aqueous mixture is conducted under high pressure in a range from about 500 psi to about 10,000 psi, from about 500 psi to about 8,000 psi, from about 1,000 to about 6,000 psi, from about 1,500 to about 6,000 psi, from about 2,000 psi to about 5,000 psi, or from about 1000 to about 3000 psi. In an embodiment, the shearing of the aqueous mixture is conducted under high shearing force of about 1000 to about 3000 psi.

Figure 2:
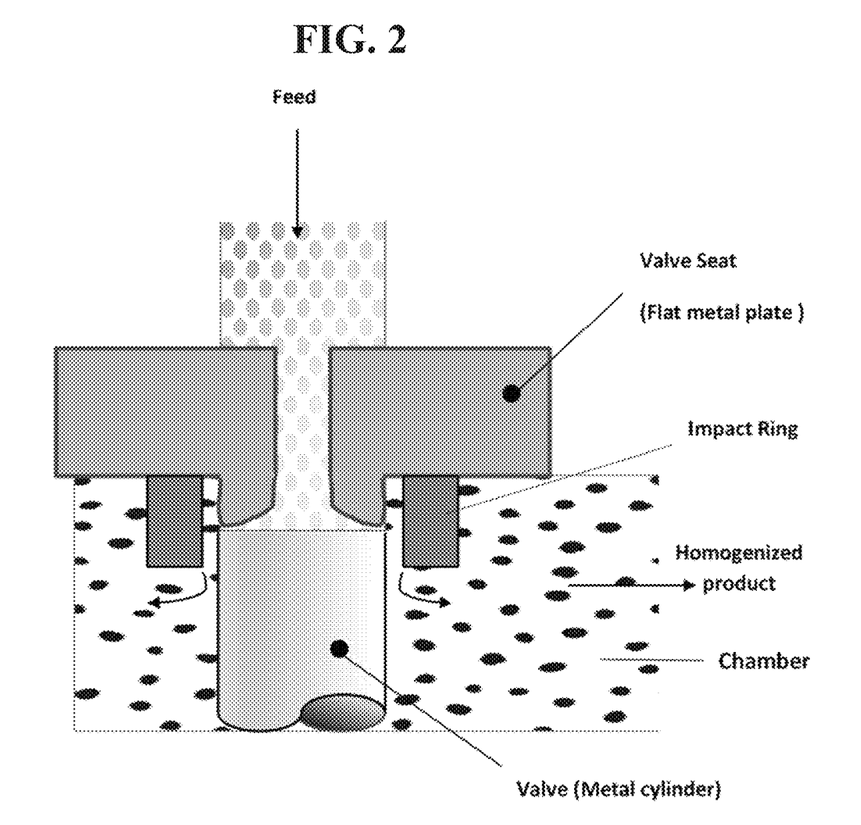
FIG. 2 shows one embodiment of the disclosed process.

In an embodiment, the shearing of the aqueous mixture is conducted by directing the aqueous mixture through a homogenizer and valve assembly comprising two components: a valve (a metal cylinder) and a valve seat (a flat metal plate) as shown in FIG. 2. The homogenizer and valve assembly may optionally comprise an impact ring. In an embodiment, the valve and valve seat are configured to fit together to form orifices. The valve (the metal cylinder) may be pressed against the valve seat (the flat metal plate), and the aqueous mixture may be forced through an opening on the valve seat (the flat metal plate) to orifices (another openings) positioned between the valve (the metal cylinder) and the valve seat (the flat metal plate).

In an embodiment, the shearing of the aqueous mixture is conducted by directing the aqueous mixture through a homogenizer and valve assembly comprising three components: a valve (a metal cylinder), a valve seat (a flat metal plate) and an impact ring as shown in FIG. 2. In an embodiment, the valve and valve seat are the pieces configured to fit together to form orifices. The valve (the metal cylinder) may be pressed against the valve seat (the flat metal plate), and the aqueous mixture may be forced through an opening on the valve seat (the flat metal plate) to orifices (another openings) positioned between the valve (the metal cylinder) and the valve seat (the flat metal plate). In an embodiment, the homogenizer and valve assembly may further comprise a high pressure annular fan and a chamber surrounding the fan as shown in FIG. 2. In an embodiment, the Impact Ring is a sacrificial piece that prevents the high pressure annular fan from damaging the chamber that surrounds it. In an embodiment, all three components are made from a special wear-resistant hardened alloy.

The homogenizer and valve assembly provides the necessary sheer configuration needed to separate graphene platelets in the graphene powder into smaller stacks while the water dispersible rheology agent provides a gel matrix to stabilize the graphene platelet particles having smaller stacks of graphene layers in the water-based graphene dispersion. This valve assembly under controlled pressure provides sheer energy through the "flat metal plate" configuration at the impact ring in which the aqueous mixture is to pass. This configuration is preferred and necessary for separating graphene into less number of stacks of graphene layers and possibly smaller plane graphene platelet particle size distribution. A non-limiting example of the homogenizer and valve assembly may be a Gaulin homogenizer and valve assembly.

Another aspect of the present disclosure provides a water-based graphene dispersion, the water-based graphene dispersion comprising an aqueous solution including ingredients of graphene platelet particles, a super wetter surfactant, a water dispersible rheology agent and water. In an embodiment, the aqueous solution may comprise a base neutralizer. In an embodiment, the water-based graphene dispersion is prepared by the method disclosed herein. In an embodiment, the water-based graphene dispersion is stable without visible phase separation after storage at room temperature for at least 1 hour, 1 day, 1 week, 1 year or even more than 1 year.

In an embodiment, the water may be deionized (DI) water. In an embodiment, the graphene platelet particles is dispersed homogeneously in the aqueous solution.

In an embodiment, the graphene platelet particles dispersed in the water-based graphene dispersion have an average thickness less than about 100 nanometer (nm), less than about 50 nm, from about 1 nm to about 100 nm, from about 1 nm to about 50 nm, from about 1 nm to about 20 nm, preferably from about 1 nm to about 10 nm, from about 1 nm to about 5 nm, or from about 1 nm to about 3 nm.

In an embodiment, the graphene platelet particles dispersed in the water-based graphene dispersion have an average particle diameter of less than about 50 micrometer (μm), less than about 20 μm, less than about 10 μm, less than about 5 μm, less than about 3 μm, less than about 2 μm, from about 0.1 μm to about 10 μm, from about 0.5 μm to about 5 μm, from about 0.5 μm to about 3 μm, from about 0.1 μm to about 2 μm, or from about 0.5 μm to about 2 μm.

In an embodiment, the graphene platelet particles dispersed in the water-based graphene dispersion have an average surface area of about 10-2,629 $m^2/g$, about 100-2,500 $m^2/g$, about 200-2,000 $m^2/g$, about 300-1,500 $m^2/g$, or about 300-1,000 $m^2/g$.

In an embodiment, the water-based graphene dispersion can be stable without visible phase separation after storage at room temperature for at least 1 hour, 1 day, 1 week, 1 year or even more than 1 year.

In an embodiment, the water dispersible rheology agent is described herein above. In an embodiment, the water dispersible rheology agent is acidic when mixed with water. In an embodiment, the water dispersible rheology agent generates a gel matrix in the aqueous solution, especially when neutralized with the base neutralizer. The gel matrix generated by the water dispersible rheology agent coats the surface of the graphene platelet particles and thus preventing the agglomeration of the graphene platelet particles to stabilize the water-based graphene dispersion.

In an embodiment, the super wetter surfactant is described herein above.

By carefully selecting a combination of the ingredients of graphene powder, the water dispersible rheology agent, the super wetter surfactant and the base neutralizer in the specific amounts; the specific dispersing process and conditions; and the high shearing stabilization homogenization under high pressures, Applicant surprisingly found that the resultant water-based graphene dispersion can be stable without visible phase separation after storage at room temperature for at least 1 hour, 1 day, 1 week, 1 year or even more than 1 year. Applicant further surprisingly found that the graphene platelet particles are evenly and homogenously dispersed in the water-based graphene dispersion as platelets having, on average, less than fifty layers, less than twenty layers, less than ten layers, less than five layers, less than four layers, or even less than three layers of graphene, or even as platelets having single, double and/or triple layers of graphene. In an embodiment, the graphene platelet particles dispersed in the water-based graphene dispersion substantially consists of only single, double and/or triple layers of graphene. In an embodiment, the graphene platelet particles dispersed in the water-based graphene dispersion substantially consists of only single and double layers of graphene. In an embodiment, more than about 10 wt. %, more than about 20 wt. %, more than about 30 wt. %, more than about 40 wt. %, more than about 50 wt. %, more than about 60 wt. %, more than about 70 wt. %, more than about 80 wt. %, more than about 90 wt. %, more than about 95 wt. %, more than about 99 wt. %, between about 10 wt. % and about 90 wt. %, or between about 20 wt. % and about 80 wt. % of the graphene platelet particles dispersed in the water-based graphene dispersion are single, double and/or triple layers of graphene.

Applicant further surprisingly found that the unique combination of the composition and the shearing process of the present disclosure significantly reduces the thickness of the graphene platelet particles and improves the stability of the water-based graphene dispersion with balanced cost or even low cost.

Another aspect of the present disclosure provides a car care product comprising the water-based graphene dispersion disclosed herein. In an embodiment, the car care product may further comprise at least one of anionic surfactants, cationic surfactants, non-ionic surfactants, amphoteric surfactants, non-ionic emulsifiers, UV absorbers, mineral oil, butyl cellosolve, fragrances, colorants, preservatives, thickening agents, abrasive polishing agents, neutralizing agents, or stabilizing agents.

In an embodiment, the water-based graphene dispersion disclosed herein can be added to a variety of car care products where benefits of graphene to modify surface protection/lubrication and other desired surface modifications can be achieved. An example of an automotive wax composition may comprise at least one of anionic surfactants, cationic surfactants, non-ionic surfactants, amphoteric surfactants, non-ionic emulsifiers, UV absorbers, mineral oil, butyl cellosolve, fragrances, colorants, preservatives, thickening agents, abrasive polishing agents, neutralizing agents, or stabilizing agents.

Additional features and advantages are described herein, and will be apparent from the following Detailed Description and the figures.

DETAILED DESCRIPTION

All percentages expressed herein are by weight of the total weight of the composition unless expressed otherwise. Similarly, all ratios are by weight unless expressed otherwise. When reference herein is made to the pH, values correspond to pH measured at about 25° C. with standard equipment. As used herein, "room temperature" or "room temperatures" are understood to refer to a temperature of 25±3° C.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "a component" or "the component" includes two or more components.

The words "comprise," "comprises" and "comprising" are to be interpreted inclusively rather than exclusively. Likewise, the terms "include," "including," "containing" and "having" should all be construed to be inclusive, unless such a construction is clearly prohibited from the context. Further in this regard, these terms specify the presence of the stated features but not preclude the presence of additional or further features.

Nevertheless, the compositions and methods disclosed herein may lack any element that is not specifically disclosed herein. Thus, a disclosure of an embodiment using the term "comprising" is (i) a disclosure of embodiments having the identified components or steps and also additional components or steps, (ii) a disclosure of embodiments "consisting essentially of" the identified components or steps, and (iii) a disclosure of embodiments "consisting of" the identified components or steps. Any embodiment disclosed herein can be combined with any other embodiment disclosed herein.

The term "and/or" used in the context of "X and/or Y" should be interpreted as "X," or "Y," or "X and Y." Similarly, "at least one of X or Y" should be interpreted as "X," or "Y," or "X and Y." For example, "at least one of monobasic sodium phosphate or dibasic sodium phosphate" should be interpreted as "monobasic sodium phosphate," or "dibasic sodium phosphate," or "both monobasic sodium phosphate and dibasic sodium phosphate."

Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly indicated otherwise.

The terms "substantially no," "essentially free" or "substantially free" as used in reference to a particular component means that any of the component present constitutes less than about 3.0% by weight, such as less than about 2.0% by weight, less than about 1.0% by weight, preferably less than about 0.5% by weight or, more preferably, less than about 0.1% by weight.

In U.S. Patent Provisional Application No. 63/119,738 (the '738 Provisional Application), a process using an organic solvent and silica under high pressure sheer force to create a liquid intermediate containing thin layers of graphene that allows for easy dispersion of graphene in a liquid organic solvent system was disclosed. The content of the '738 Provisional Application is incorporated herein by reference in its entirety for all purposes.

In the '738 Provisional Application, high sheer processing of graphene and silica together in a liquid organic solvent system result in stable graphene platelets. During the process, thick layers of graphene can break down to smaller layers of graphene that is more usable. The silica forms a gel simultaneously as graphene platelet multiple stacks are sheered into smaller platelet stacks through the organic solvent carrier. The small platelet stacks are dispersed in the gel and held by the network of the gel stably.

The '738 Provisional Application demonstrated that the key factor to achieve stabilized graphene dispersion was the unique combination of a non-polar solvent, silica ($SiO_2$) and agglomerated graphene. The composition included agglomerated graphene such as xGnP® R-7 Graphene Nanoplatelets from XG Sciences, silica such as CAB-O-SIL® TS-530 Fumed Silica from Cabot, and a petroleum distillate such as LVP Petroleum Distillate. The composition was combined and then sheared through a Gaulin homogenizer under a high shear pressure of 2000-5000 psi. The high pressure homogenization milling process produced a statistical reduced particle size distribution of graphene platelets with $SiO_2$ in a stable petroleum distillate solution.

The present disclosure provides a water-based graphene dispersion and a method of preparing the water-based graphene dispersion by shear stabilization. Applicant surprisingly found that by shearing, preferably under high shear pressures, an aqueous dispersion of unique combination of ingredients comprising a graphene powder, a surfactant, a water dispersible rheology agent and water, a water-based graphene dispersion can be achieved with graphene platelet particles having fewer layers of graphene dispersed evenly and homogeneously in the water-based graphene dispersion. Applicant surprisingly found that the resultant water-based graphene dispersion can be stable without visible phase separation after storage at room temperature for at least 1 month or even at least 1 year.

One aspect of the present disclosure provides a method of preparing a water-based graphene dispersion using shear stabilization, the method comprising: providing water; adding a graphene powder, a super wetter surfactant and a water dispersible rheology agent into the water to form an aqueous mixture; and shearing the aqueous mixture to form the water-based graphene dispersion with graphene platelet particles dispersed in the water-based graphene dispersion. In an embodiment, the water may be deionized (DI) water.

In an embodiment, the method further comprising adding a base neutralizer into the aqueous mixture before, during and/or after shearing the aqueous mixture, preferably after shearing the aqueous mixture to adjust the pH value of the water-based graphene dispersion to be about 2-12, about 3-11, about 4-10, about 5-9, about 6-9, about 7-9, about 6.5-8.5, about 7.0-8.5, or preferably about 6.8-7.2. The base neutralizer may be an alkaline chemical, an alkaline base, or an amine neutralizer. In an embodiment, the base neutralizer may be selected from the group consisting of sodium hydroxide (NaOH), potassium hydroxide (KOH), ammonium hydroxide ($NH_3 \cdot H_2O$ or $NH_4OH$), morpholine ($O(CH_2CH_2)_2NH$), and combinations thereof. The base neutralizer is preferably NaOH in an aqueous solution form, such as a 0.001-50% active NaOH aqueous solution.

In an embodiment, the method further comprising adding a preservative to the aqueous mixture before, during and/or after shearing the aqueous mixture, preferably before shearing the aqueous mixture. The preservative may be benzisothiazolinone (BIT), Methylisothiazolinone (MIT), sodium benzoate, sorbic acid, butylated hydroxyanisole (BHA), butylated hydroxytoluene (BHT), nitrites, sulfites, sodium sorbate, potassium sorbate, or combinations thereof. Preferably, the preservative is benzisothiazolinone (BIT). The preservative may be added in an amount of about 0.0001-10 wt. %, about 0.0001-5 wt. %, about 0.0001-1 wt. %, about 0.0005-0.5 wt. %, or preferably about 0.1 wt. %.

In an embodiment, the graphene powder is an agglomerated graphene having an average particle size in a range of about 0.01-1000 micrometer (μall), about 0.1-100 μm, about 0.5-50 μm, about 0.5-20 μm, about 1-20 μm, or about 1-10 μm. In an embodiment, the graphene powder may be selected from the group consisting of an agglomerated graphene, a chemically modified agglomerated graphene, an agglomerated graphene oxide, an agglomerated reduced graphene oxide, an expanded graphite or graphene, a thermally expanded graphite or graphene, a chemically exfoliated graphite or graphene, and combinations thereof. In an embodiment, the graphene powder may be xGnP® C-300, C-500 or C-750 Graphene Nanoplatelets powder from XG Sciences. The graphene powder is added in an amount of about 0.01-30 wt. %, about 0.05-20 wt. %, about 0.1-20 wt. %, about 0.1-10 wt. %, 0.1-5 wt. %, or about 0.5-5 wt. % of the water-based graphene dispersion. In an embodiment, the graphene powder is xGnP® C-300 Graphene Nanoplatelets powder from XG Sciences. In an embodiment, the graphene powder is added in a preferred amount of about 0.1-10 wt. % of the water-based graphene dispersion.

In an embodiment, the graphene powder has a first number of graphene layers. In an embodiment, the graphene platelet particles dispersed in the water-based graphene dispersion has a second number of graphene layers. In an embodiment, the second number is less than the first number. In an embodiment, the first number of graphene layers of the graphene powder before shearing is on average in a range of about 1-5000, about 10-2000, about 20-1500, about 50-1000, about 50-500 or about 10-100. In an embodiment, the second number of graphene layers of the graphene platelet particles dispersed in the water-based graphene dispersion after shearing is on average in a range of less than about 500, less than about 100, less than about 50, less than about 20, less than about 10, about 1-100, about 1-50, about 1-20, preferably about 1-10, about 1-5, 1-3 or 1-2.

In an embodiment, the graphene platelet particles dispersed in the water-based graphene dispersion have an average thickness less than about 100 nanometer (nm), less than about 50 nm, from about 1 nm to about 100 nm, from about 1 nm to about 50 nm, from about 1 nm to about 20 nm, preferably from about 1 nm to about 10 nm, from about 1 nm to about 5 nm, from 1 nm to 3 nm, or from 1 nm to 2 nm.

In an embodiment, the graphene platelet particles dispersed in the water-based graphene dispersion have an average lateral size (an average diameter in the plane dimensions of the graphene platelet particles) of less than about 50 micrometer (μm), less than about 20 μm, less than about 10 μm, less than about 5 μm, less than about 3 μm, less than about 2 μm, from about 0.1 μm to about 10 μm, from about 0.5 μm to about 5 μm, from about 0.5 μm to about 3 μm, from about 0.1 μm to about 2 μm, or from about 0.5 μm to about 2 μm.

In an embodiment, the graphene platelet particles dispersed in the water-based graphene dispersion have an average surface area of about 10-2,629 $m^2/g$, about 100-2,500 $m^2/g$, about 200-2,000 $m^2/g$, about 300-1,500 $m^2/g$, or about 300-1,000 $m^2/g$.

In an embodiment, the water-based graphene dispersion can be stable without visible phase separation after storage at room temperature for at least 1 hour, 1 day, 1 week, 1 year or even more than 1 year.

In an embodiment, the super wetter surfactant may be a surfactant capable of reducing the surface tension of the aqueous dispersion of the ingredients. In an embodiment, the super wetter surfactant may be an organomodified copolymer that can provide surface tension reduction and super-spreading properties to aqueous solutions while remaining stable in formulations having a pH value of about 2-12. In an embodiment, the super wetter surfactant is selected from the group consisting of a silicone based super wetter that reduces the surface tension of water, an organomodified copolymer, SILWET™ Hydrostable 212 from Momentive, and combinations thereof. Preferably, the super wetter surfactant can reduce the surface tension in an aqueous solution down between 40-50 mN/m. In an embodiment, the super wetter surfactant is SILWET™ Hydrostable 212 from Momentive.

In an embodiment, the super wetter surfactant is added to the water-based graphene dispersion in an amount capable of reducing the water surface tension from 72 mN/m to about 26.7-65 mN/m, about 30-60 mN/m, or preferably about 40-50 mN/m. In an embodiment, the super wetter surfactant is added in an amount of about 0.01-5.0 wt. %, about 0.05-3.0 wt. %, about 0.05-2.0 wt. %, or preferably about 0.1-1.0 wt. % of the water-based graphene dispersion.

In an embodiment, the water dispersible rheology agent is added into the aqueous mixture to facilitate the dispersion of the graphene in the water-based graphene dispersion, and prevent further agglomeration of graphene and to stabilize the water-based graphene dispersion. The water dispersible rheology agent may be selected from the group consisting of a polyacrylic acid polymer powder, a crosslinked polyacrylic acid polymer powder, a hydrophobically-modified crosslinked polyacrylic acid polymer powder, Carbopol® polymers with different crosslinking densities, Carbopol® EZ-2, 3, 4 and 5 polymers from Lubrizol, and combinations thereof, and preferably a hydrophobically-modified crosslinked polyacrylic acid polymer powder. In an embodiment, the water dispersible rheology agent is the polyacrylic acid polymer crosslinked with polyalkenyl polyether or divinyl glycol at different crosslinking densities. In an embodiment, the crosslinking density of the polyacrylic acid polymer is in a range of about 0.001-90%, about 0.01-70%, about 0.01-60%, about 0.01-50%, about 0.01-10%, about 0.01-5%, or about 0.05-4%.

In an embodiment, the water dispersible rheology agent is acidic when it is mixed with water. In an embodiment, the water dispersible rheology agent creates a gel matrix when neutralized with a base neutralizer in the aqueous solution.

In an embodiment, the water dispersible rheology agent is added into the aqueous mixture in an amount of about 0.01-10 wt. %, about 0.01-5 wt. %, about 0.05-5.0 wt. %, about 0.1-3.0 wt. %, about 0.1-3.0 wt. %, or preferably about 0.05-4 wt. %. In an embodiment, the water dispersible rheology agent is added into the aqueous mixture in an amount of about 0.2 wt. % of the water-based graphene dispersion.

In an embodiment, the shearing of the aqueous mixture is conducted under high pressure in a range from about 500 psi to about 10,000 psi, from about 500 psi to about 8,000 psi, from about 1,000 to about 6,000 psi, from about 1,500 to about 6,000 psi, from about 2,000 psi to about 5,000 psi, from about 1,000 psi to about 5,000 psi, or from about 1000 to about 3000 psi. In an embodiment, the shearing of the aqueous mixture is conducted under high shearing force from about 1000 to about 3000 psi.

In an embodiment, the shearing of the aqueous mixture is conducted by directing the aqueous mixture through a homogenizer and valve assembly comprising two components: a valve (a metal cylinder) and a valve seat (a flat metal plate) as shown in FIG. 2. The homogenizer and valve assembly may optionally comprise an impact ring. In an embodiment, the valve and valve seat are configured to fit together to form orifices. The valve (the metal cylinder) may be pressed against the valve seat (the flat metal plate), and the aqueous mixture may be forced through an opening on the valve seat (the flat metal plate) to orifices (another openings) positioned between the valve (the metal cylinder) and the valve seat (the flat metal plate).

In an embodiment, the shearing of the aqueous mixture is conducted by directing the aqueous mixture through a homogenizer and valve assembly comprising three components: a valve (a metal cylinder), a valve seat (a flat metal plate) and an impact ring as shown in FIG. 2. In an embodiment, the valve and valve seat are the pieces configured to fit together to form orifices. The valve (the metal cylinder) may be pressed against the valve seat (the flat metal plate), and the aqueous mixture may be forced through an opening on the valve seat (the flat metal plate) to orifices (another openings) positioned between the valve (the metal cylinder) and the valve seat (the flat metal plate). In an embodiment, the homogenizer and valve assembly may further comprise a high pressure annular fan and a chamber surrounding the fan as shown in FIG. 2. In an embodiment, the Impact Ring is a sacrificial piece that prevents the high pressure annular fan from damaging the chamber that surrounds it. In an embodiment, all three components are made from a special wear-resistant hardened alloy.

Figure 3:
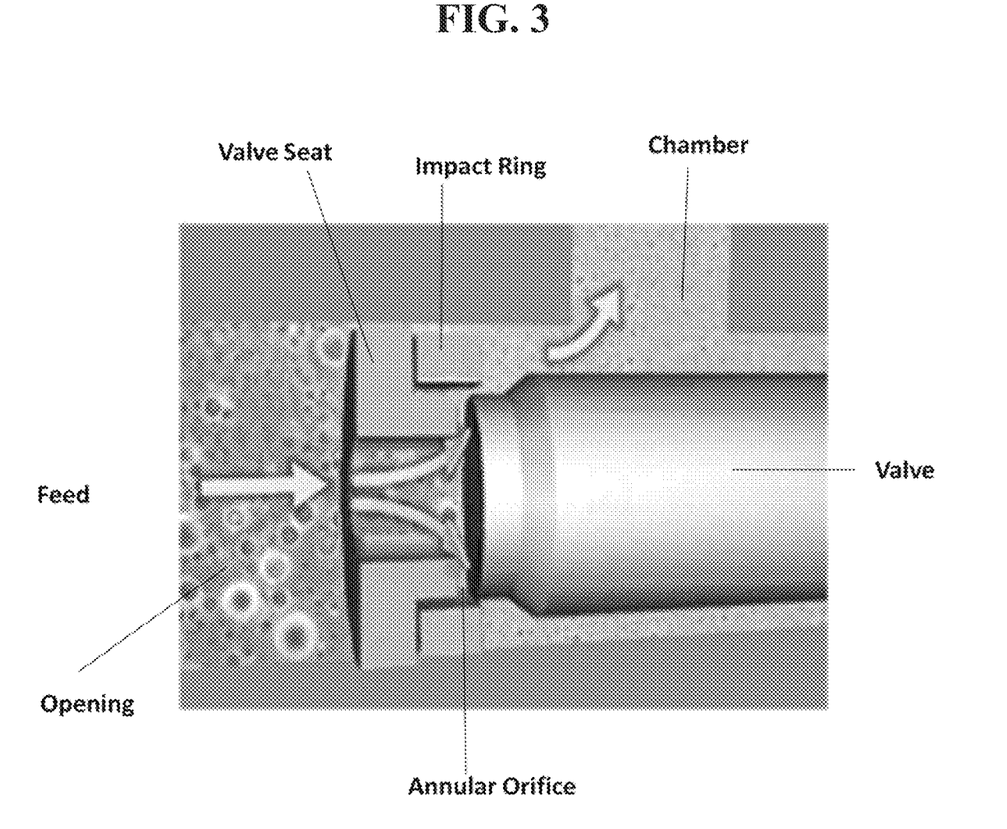
FIG. 3 shows one embodiment of the disclosed process with arrows showing the flowing directions of the aqueous solution.

In one embodiment as shown in FIG. 3, the aqueous mixture containing the graphene powder may be directed through a restricted orifice formed by the valve and the valve seat under high shear pressures. The aqueous mixture may be directed through the orifice by a pump. The arrows in FIG. 3 shows the flow directions of the aqueous solution.

The homogenizer and valve assembly provides the necessary sheer configuration needed to separate graphene platelets in the graphene powder into smaller stacks while the water dispersible rheology agent provides a gel matrix to stabilize the graphene platelet particles having smaller stacks of graphene layers in the water-based graphene dispersion. This valve assembly under controlled pressure provides sheer energy through the "flat metal plate" configuration at the impact ring in which the aqueous mixture is to pass. This configuration is preferred and necessary for separating graphene into less number of stacks of graphene layers and possibly smaller plane graphene platelet particle size distribution. A non-limiting example of the homogenizer and valve assembly may be a Gaulin homogenizer and valve assembly.

In an embodiment as shown in FIG. 2, the aqueous mixture containing the graphene powder and the water dispersible rheology agent may be directed through a restricted orifice formed by the valve (the metal cylinder) and a valve seat (the flat metal plate). The aqueous mixture may be directed through the orifice by a pump.

The valve may be pressed against the valve seat by an extreme pressure. The pressure applied on the valve may be in the range of about 1500-6000 psi, preferably about 2000-6000 psi. This high pressure ensures that the graphene powders are sheared to a stable form in the resultant water-based graphene dispersion. A pressure of below about 1500 psi leads to a wider platelet particle size distribution curve and larger stacks of graphene platelets, which will settle in the water-based graphene dispersion.

The aqueous mixture may be forced through an opening on the valve seat. The aqueous mixture may then pass between the valve and the valve seat. The pumping pressure applied on the aqueous mixture may be higher than the pressure between the metal plate and metal cylinder such that the feed of the aqueous mixture can be directed through the opening and then between the valve and the valve seat.

When the aqueous mixture passes between the valve and the valve seat, the thick layers of graphene may be broken into thin layers by the high shear pressure between the valve and the valve seat. The greater the pressure between the valve and the valve seat, the smaller the graphene platelet particle size.

When the aqueous mixture is directed, e.g., forced by the pumping pressure, through the opening on the valve seat and between the valve and the valve seat, and then exits from between the valve and the valve seat, the pressure on the aqueous mixture drops significantly. This pressure drop allows the aqueous mixture to flow and homogenizes the pass-through liquid of the aqueous mixture that contains thin layers of graphene such that the smaller graphene platelet particle are well dispersed in the resultant water-based graphene dispersion. The greater the pressure drop is, the greater the level of homogenization.

As a non-limiting example, this process may be conducted on a Gaulin Homogenizer with the specific valve assembly discussed above.

The disclosed process thus reduces the particle size of the graphene and creates more uniform graphene platelets. In the resultant water-based graphene dispersion, at least about 90% of the graphene platelet particles have 10 layers or less of graphene. In some embodiments, about 5-10% of the graphene platelet particles may still have more than 10 layers.

Further, after homogenization, when a base neutralizer is added to and mixed into the water-based graphene dispersion to neutralize the water dispersible rheology agent and thus to adjust the pH to a value of about 6.5-8.5, about 7-8.5 or about 6.8-7.2, the water dispersible rheology agent forms a gel matrix comprising a three-dimensional structure and with a higher rheology/viscosity than the original aqueous solution. The viscosity of the resultant gel matrix can range from about 200 to about 600,000 centistokes, or from about 400 to 5,000 centistokes after processing through the Gaulin and neutralizing.

The graphene platelet particles are dispersed in the three-dimensional network of the gel matrix and held therein stably in the gel matrix. Thus the graphene platelet particles are kept apart from each other in the gel matrix, breaking up the Van der Waals forces between them, so that the graphene platelet particles do not aggregate and thus maintain their thin layers of two-dimensional configuration.

The disclose process thus provides stabilization of the graphene platelet particles in the water-based graphene dispersion. The terms "stable" and "stabilization" used herein means substantially all of the graphene platelet particles are suspended without visible phase separation, e.g., not settled or sedimented, after at least one month, preferably at least two months, more preferably at least six months, most preferably at least one year, at a temperature in the range of about 0° C. to about 50° C., for example, at room temperature.

Another aspect of the present disclosure provides a water-based graphene dispersion prepared by the method disclosed herein, the water-based graphene dispersion comprising: graphene platelet particles dispersed homogeneously in the water-based graphene dispersion; a super wetter surfactant; a water dispersible rheology agent; and water. In an embodiment, the water-based graphene dispersion may further comprise a base neutralizer. In an embodiment, the water-based graphene dispersion is stable without visible phase separation after storage at room temperature for at least 1 day, 1 week, 1 month, or 1 year.

In an embodiment, the water dispersible rheology agent when neutralized with the base neutralizer forms a gel matrix which may coats the surfaces of the dispersed graphene platelet particles. In an embodiment, the water-based graphene dispersion has a pH value of about 7.0-8.5. In an embodiment, the water may be DI water.

In an embodiment, the graphene platelet particles dispersed in the water-based graphene dispersion have an average thickness less than about 100 nanometer (nm), less than about 50 nm, less than about 10 nm, less than about 5 nm, from about 1 nm to about 100 nm, from about 1 nm to about 50 nm, from about 1 nm to about 20 nm, preferably from about 1 nm to about 10 nm, from about 1 nm to about 5 nm, or from about 1 nm to about 3 nm.

In an embodiment, the graphene platelet particles dispersed in the water-based graphene dispersion have an average plane particle diameter of less than about 50 micrometer (μm), less than about 20 μm, less than about 10 μm, less than about 5 μm, less than about 3 μm, less than about 2 μm, from about 0.1 μm to about 10 μm, from about 0.5 μm to about 5 μm, from about 0.5 μm to about 3 μm, from about 0.1 μm to about 2 μm, or from about 0.1 μm to about 2 μm.

In an embodiment, the graphene platelet particles dispersed in the water-based graphene dispersion have an average surface area of about 10-2,629 $m^2/g$, about 100-2,500 $m^2/g$, about 200-2,000 $m^2/g$, about 300-1,500 $m^2/g$, about 300-1,000 $m^2/g$, about 100-800 $m^2/g$, or about 100-500 $m^2/g$.

In an embodiment, the water-based graphene dispersion can be stable without visible phase separation after storage at room temperature for at least 1 hour, 1 day, 1 week, 1 year or even more than 1 year.

In an embodiment, the water dispersible rheology agent is described herein above. In an embodiment, the water dispersible rheology agent is acidic when mixed with water. In an embodiment, the water dispersible rheology agent generates a gel matrix in the aqueous solution, especially when neutralized with the base neutralizer. The gel matrix generated by the water dispersible rheology agent coats the surface of the graphene platelet particles and thus preventing the agglomeration of the graphene platelet particles to stabilize the water-based graphene dispersion.

In an embodiment, the super wetter surfactant is described herein above.

By carefully selecting a combination of the ingredients of graphene powder, the water dispersible rheology agent, the super wetter surfactant and the base neutralizer in the specific amounts; the specific dispersing process and conditions; and the high shearing stabilization homogenization under high pressures, Applicant surprisingly found that the resultant water-based graphene dispersion can be stable without visible phase separation after storage at room temperature for at least 1 day, 1 week, 1 month, 6 months, or 1 year. Applicant further surprisingly found that the graphene platelet particles are evenly and homogenously dispersed in the water-based graphene dispersion as platelets having, on average, less than fifty layers, less than twenty layers, less than ten layers, less than five layers, less than four layers, or even less than three layers of graphene, or even as platelets having single, double and/or triple layers of graphene. In an embodiment, the graphene platelet particles dispersed in the water-based graphene dispersion substantially consists of only single, double and/or triple layers of graphene. In an embodiment, the graphene platelet particles dispersed in the water-based graphene dispersion substantially consists of only single and double layers of graphene. In an embodiment, more than about 10 wt. %, more than about 20 wt. %, more than about 30 wt. %, more than about 40 wt. %, more than about 50 wt. %, more than about 60 wt. %, more than about 70 wt. %, more than about 80 wt. %, more than about 90 wt. %, more than about 95 wt. %, more than about 99 wt. %, between about 10 wt. % and about 90 wt. %, or between about 20 wt. % and about 80 wt. % of the graphene platelet particles dispersed in the water-based graphene dispersion are single, double and/or triple layers of graphene.

Applicant further surprisingly found that the unique combination of the composition and the shearing process of the present disclosure significantly reduces the thickness of the graphene platelet particles and improves the stability of the water-based graphene dispersion with balanced cost or even low cost.

In an embodiment, the water-based graphene dispersion can be added to a variety of car care products where benefits of graphene to modify surface protection/lubrication and other desired surface modifications can be achieved. An example of an automotive wax composition may comprise at least one of anionic surfactants, cationic surfactants, non-ionic surfactants, amphoteric surfactants, non-ionic emulsifiers, UV absorbers, mineral oil, butyl cellosolve, fragrances, colorants, preservatives, thickening agents, abrasive polishing agents, neutralizing agents, or stabilizing agents.

In an embodiment, the graphene powder is agglomerated graphene and is added to water. High pressure shear is used to break down the agglomerated graphene to reduce the stack layers of graphene to form graphene platelet particles dispersed in the aqueous solution. This usable aqueous solution of graphene is thus prepared by producing reduced layered graphene platelets through high pressure shear plate stabilization. In this embodiment, the water based graphene formulation has been developed to reduce graphene platelet stacks into a stable water based graphene dispersion. In this embodiment, a composition comprising water such as DI water, agglomerated graphene such as xGnP® C-300 Graphene Nanoplatelets from XG Sciences, a super wetter surfactant and a water dispersible rheology agent (such as Carbopol® polymers) is first sheared under high pressures; and a alkaline neutralizer is then added to the composition after the shear process to prepare and stabilize the resulted water-based graphene dispersion.

This water-based graphene dispersion can be subsequently added as a component to a secondary water based formulation where suspended graphene platelets will remain stabilized.

In this embodiment, the high pressure shearing is conducted through a Gaulin homogenizer and valve assembly which generates a shear pressure in a range of about 2000-5000 psi. The high shear pressure is necessary to produce smaller stack of platelets for suspension in a polar aqueous solution.

The reasoning for using a Gaulin homogenizer was due to the configuration of the homogenizing valve assembly. The valve assembly provides the necessary shear configuration needed to separate graphene platelets into smaller stacks while the water dispersible rheology agent provides a gel matrix to stabilize the platelets in the aqueous solution. The valve assembly has three crucial smaller components: the valve, the valve seat, and the Impact Ring. This valve assembly under controlled pressure provides the shear energy through a "flat metal plate" configuration at the impact ring in which the solution is to pass. This configuration is preferred and necessary for separating graphene into thinner stacks of platelets and smaller particle size distribution.

Previous science articles have indicated that reducing the surface tension of a carrier solution to 40 to 50 dynes per centimeter (or mN/m) is desired for stabilizing graphene in the carrier solution. Bordes et al. (2019) reported that "Hernandez et al. (2008) and Coleman et al. (2013) have studied forty molecular solvents as media to exfoliate graphite via sonication and characterized them by the fraction of graphite/graphene remaining after centrifugation. They observed that solvents with a high ability to disperse graphite are the ones having a surface tensions between 40 and 50 mN/m."

The present disclosure utilizes an aqueous dispersion of ingredients where a super wetter surfactant capable of reducing the surface tension of aqueous dispersions, for example SILWET™ Hydrostable 212 from Momentive, is added to reduce the water surface tension from 72 mN/m to between 40 and 50 mN/m in the presence of a water dispersible rheology agent (such as a carbomer rheology polymer, Carbopol® EZ-3 polymers from Lubrizol) and xGnP® C-300 Graphene Nanoplatelets. The reduced surface tension is essential for stabilizing graphene in an aqueous dispersion.

The aqueous solution containing water, Hydrostable 212, Carbopol® EZ-3 and xGnP® C-300 Graphene Nanoplatelets is passed through a Gaulin homogenizer and valve assembly at a high shear pressure between 2000 and 5000 psi to reduce the number of agglomerated graphene platelets in the presence of Carbopol® EZ-3 polymer chains to create a water based stable dispersion with the appropriate surface tension range from 40 to 50 mN/m. The rheology reagent, Carbopol® EZ-3 polymer undergoes the shear process with the graphene powder. The rheology agent is necessary in this dispersion to prevent further graphene re-agglomeration and to stabilize the resulting graphene dispersion solution.

After homogenization, the particle size distribution of the graphene/Carbopol® polymer is greatly reduced. To further stabilize the complex, the solution containing Carbopol® polymer is immediately neutralized with an alkaline chemical to a pH value in a range of about 7.0-8.5. The alkaline or base neutralizers are preferably sodium hydroxide (NaOH), or an amine neutralizer such as ammonium hydroxide ($NH_4OH$) or morpholine ($O(CH_2CH_2)_2NH$). The base neutralizer is added to the aqueous solution after homogenization to uncoil the sheared shortened carbomer polymer chains to create a stable rheology matrix or dispersion of graphene in water. The neutralized Carbopol® polymer creates a gel matrix which may coat the surface of the dispersed graphene platelet particles having fewer stack layers of graphene and prevent the graphene platelet particles from re-agglomeration and thus to stabilize the water-based graphene dispersion. The small graphene platelet stacks are dispersed in the gel and held by the network of the gel stably.

The water-based graphene dispersion produced by the disclosed process has a wide range of applications. The water-based graphene dispersion can be used in spray painting, coatings, automotive wax, architectural coating, paint coating, etc. The water-based graphene dispersion can be paint coating binders/additives and/or electrical conductors.

As discussed above, in the water-based graphene dispersion, the water dispersible rheology agent keeps the graphene platelet particles apart from each other in the gel matrix, breaking up the Van der Waals forces between them, so that the graphene platelet particles do not aggregate and thus can maintain their thin layers of two-dimensional configuration. When the water-based graphene dispersion is added to a product, such as a painting or coating, and when the product is applied on to a surface and allowed to dry, the graphene nanoparticles can come together in the polymeric gel matrix and other components, thus strengthening the coating.

The extraordinary properties that graphene possesses can add interesting physical properties to types of coatings, paints, inks and more. For example, graphene's high resistivity can make for durable coatings that do not crack and are resistant to water and oil. Further, its excellent electrical and thermal conductivity can be used to make various conductive paints, and a strong barrier effect can contribute to extraordinary anti-oxidant, scratch-resistant and anti-UVA coatings. In car care products, graphene has thermal conductivity properties to dissipate heat or hot spots lessening water spotting.

As non-limiting examples, the water-based graphene dispersion can be added to paints and coatings, such as for radiators or other heat transfer/cooling systems, air conditioner coils, home, or automotive. The graphene can keep metals at uniform temperatures, provide the coatings with anti-wear benefits, friction modification, lubrication benefits, and/or scratch protection and/or reduction benefits.

Another aspect of the present disclosure is an automotive wax and/or coating comprising the water-based graphene dispersion produced by the disclosed process.

Additional anionic, cationic, non-ionic and/or amphoteric surfactants, as well as non-ionic emulsifiers, may be included in the automotive wax and/or coating.

Examples of anionic surfactants may include an alkylcarboxylate (soap), a polyalkoxycarboxylate, an N-acylsarcosinate, a linear alkylbenzenesulfonate (LAS), an alpha-olefin sulfonate (AOS), a dialkylsulfosuccinate, an alcohol sulfate, and/or an ethoxylated alcohol sulfate.

Examples of alkylcarboxylates (soaps) may include sodium, potassium or ammonium salts of $C_9$-$C_{21}$, fatty or rosin acids such as lauric acid, palmitic acid, stearic acid, coconut fatty acids, hydrogenated coconut fatty acids, oleic acid, and/or the like.

Examples of polyalkoxycarboxylates may include alkoxylated alcohols which have been end-capped with chloroacetate or acrylic acid. Polyalkoxycarboxylates may be produced by reaction of ethylene oxide, propylene oxide, or mixtures thereof, with an alcohol, to produce an alkoxylated alcohol having about 2 to about 50 moles of oxyalkylene groups per mole of alcohol, followed by reaction of the free hydroxyl end group of the alkoxylate with chloroacetate or acrylate.

Examples of N-acylsarcosinates may be amidocarboxylates produced by the reaction of a fatty acid or rosin acid chloride with sodium sarcosinate. Commercial examples include sodium N-cocoylsarcosinate, sodium N-laurylsarcosinate, sodium N-oleoylsarcosinate and the like.

Examples of commercial linear alkylbenzenesulfonates (LAS) may include alkali metal or ammonium salts of alkylbenzenesulfonic acids, wherein the alkyl substituent may be a linear $C_9$-$C_{13}$ alkyl group such as sodium dodecylbenzene sulfonate (SDS).

Examples of alpha-olefin sulfonates (AOS) may be products of sulfonation of alpha-olefins with sulfur trioxide and air, followed by neutralization of the intermediate sultones. Commercial examples include sulfonated $C_{10}$ to $C_{14}$ alpha-olefin, generally neutralized with an alkali metal hydroxide, an alkaline earth hydroxide, or an ammonium hydroxide.

Examples of dialkylsulfosuccinates may be alkali metal or ammonium salts of $C_5$-$C_{18}$ diesters of sulfosuccinic acid, such as sodium diamylsulfosuccinate, sodium dioctylsulfosuccinate, sodium di-(2-ethylhexyl)sulfosuccinate and/or the like.

Examples of commercial alcohol sulfates may include alkali metal, alkaline earth metal or ammonium salts of sulfate esters of $C_8$-$C_{12}$ alcohols such as sodium laurylsulfate, sodium 2-ethylhexylsulfate, lauryl triethanolammonium sulfate, sodium octylsulfate and/or the like.

Examples of ethoxylated alcohol sulfates may be alkali metal or ammonium salts of sulfate esters of $C_8$-$C_{18}$ alcohols ethoxylated with about 10 to about 40 weight percent of ethylene oxide, based on the weight of alcohol.

Examples of cationic emulsifiers may include an amine, an aliphatic or rosin amine ethoxylate, an amidoamine, and a quaternary ammonium salt. Amphoteric emulsifiers that exhibit cationic properties below a pH of about 7 may also be suitable for the present purposes and are included herein under the term "cationic emulsifier." Illustrative of such amphoteric emulsifiers are cocamidopropyl betaine, carboxyalkyl imidazolines, and/or the like.

Examples of amine cationic emulsifiers may include amines derived from fatty acids and rosins such as hydrogenated tallow amine, stearyl amine, lauryl amine, and the like, which are typically commercially available as acetate, oleate or naphthalenate salts. Other examples of amine cationic emulsifiers may include N-alkyltrimethyleneamines having the general formula R*NHCH$_2$CH$_2$CH$_2$NH$_2$, wherein R* is an alkyl group derived from natural oils such as coconut, tallow and soybean oils and the like; 2-alkylimidazolines, such as 2-heptadecylimidazoline, 2-heptadecenylimidazoline and the like; and/or 1-aminoethyl-2-alkyl imidazolines.

Examples of commercially available aliphatic and rosin amine ethoxylate cationic emulsifiers may include $C_6$-$C_{20}$ alkyl amines and rosin amines that have been ethoxylated with about 2 to about 50 moles of ethylene oxide per mole of amine, such as cocoamine, soyamine or stearylamine ethoxylated with 2 to 15 moles of ethylene oxide per mole of amine.

Examples of amidoamine cationic emulsifiers may include condensation products of fatty carboxylic acids with di- and polyamines, such as condensates of diethylenetriamine with stearic, oleic, coconut, or tall oil fatty acids, and/or the like.

Examples of quaternary amine cationic emulsifiers include dialkyldimethylammonium salts, such as dicocodimethylammonium chloride, di stearyldimethylammonium chloride, and/or the like; alkylbenzyldimethylammonium chlorides such as cocobenzyldimethylammonium chloride, tallowbenzyldimethylammonium chloride, stearylbenzyldimethylammonium chloride and the like; and alkyltrimethylammonium salts such as cetyltrimethylammonium chloride, myristyltrimethylammonium bromide and/or the like; wherein the above alkyl groups are derived from fatty amines and rosin amines.

Examples of nonionic surfactants may include an alcohol alkoxylate, a polyol ester of a fatty acid, a polyoxyethylene ester of a fatty acid, a fatty acid amide, a polyoxyethylene fatty acid amide, a polyalkylene oxide block copolymer, an ethoxylated alkyl mercaptan, an ethoxylated anhydrosorbitol ester, and/or an alkyl polyglycoside. Further examples may include amine oxides prepared by hydrogen peroxide oxidation of tertiary aliphatic amines such as cetyldimethylamine oxide, stearyldimethylamine oxide, tallow-bis-(2-hydroxyethyl)amine oxide, stearyl-bis(2-hydroxyethyl) amine oxide, and/or the like.

Examples of alcohol alkoxylates may include ethoxylated $C_6$-$C_{18}$ linear and branched alcohols, ethoxylated with about 2 to about 80 moles of ethylene oxide, such as ethoxylated lauryl alcohol, ethoxylated stearyl alcohol, and ethoxylated mixtures of $C_6$-$C_{18}$ alcohols, and alkoxylated natural alcohols such as ethoxylated propoxylated pine oil, ethoxylated soya sterol, and/or the like.

Examples of polyol esters of fatty acids include saturated fatty acid monoglycerides, such as glycerol monolaurate, glycerol monococo ester, glycerol monotallow ester, glycerol monostearate, and/or the like; saturated fatty acid diglycerides, such as glycerol distearate, glycerol dilaurate and/or the like; unsaturated fatty acid monoglycerides, such as glycerol monooleate, glycerol monoricinoleate, and/or the like; unsaturated fatty acid diglycerides, such as glycerol dioleate, glycerol dilinoleate, and/or the like; glycol esters of fatty acids, such as propylene glycol monostearate, ethylene glycol monostearate, ethylene glycol monolaurate, diethylene glycol monooleate, diethylene glycol monostearate, and/or the like; and/or anhydrosorbitol fatty acid esters, such as mono, di and tri esters of 1,4-sorbitan with fatty acids such as stearic acid, palmitic acid and/or oleic acid.

Examples of polyoxyethylene esters of fatty acids may be polyethylene glycol mono- and di-esters of fatty acids comprising a polyethylene glycol portion having from about 5 to about 30 ethyleneoxy units, esterified at one or both ends with fatty acids such as stearic acid, lauric acid, oleic acid, and mixed fatty acids derived from natural oils such as coconut oil, castor oil, tall oil, and/or the like.

Examples of fatty acid amides may include diethanolamine fatty acid condensates such as coco diethanolamide, lauric diethanolamide, tall oil diethanolamide, and the like, and monoalkanolamine fatty acid condensates such as coco monoethanolamide, lauric monoethanolamide, stearic monoisopropanolamide, oleic monopropanolamide, and/or the like.

Examples of polyoxyethylene fatty acid amides may be ethoxylated mono and dialkanolamides having from about 2 to about 50 ethylene oxide groups, including ethoxylated lauric monoisopropanolamide, ethoxylated stearic diethanolamide, ethoxylated myristic monoethanolamide, ethoxylated oleic diethanolamide, and/or the like.

Examples of polyalkylene oxide block copolymers may include copolymers of ethylene oxide and propylene oxide initiated by ethylene glycol, propylene glycol, trimethylol propane, and the like, and have either linear or branched structures, depending on whether the initiator has two or three hydroxyl groups, respectively.

Examples of ethoxylated alkyl mercaptans may include linear or branched alkyl mercapatans such as dodecylmercaptan, ethoxylated with 2 to 10 moles of ethylene oxide per mole of mercaptan.

Examples of ethoxylated anhydrosorbitol esters may be mono, di and tri esters of 1,4-sorbitan with fatty acids such as stearic acid, palmitic acid and oleic acid that have been ethoxylated with about 4 to about 20 moles of ethylene oxide per mole of anhydrosorbitol ester.

Examples of alkyl polyglycosides may be glycosides (acetals) of $C_6$-$C_{20}$ alcohols with a monosaccharide such as glucose, fructose, lactose, mannose, xylose and the like or a polysaccharide or oligosaccharide such as isomaltose, maltose, cellobiose, mellobiose, maltotriose and/or the like.

Examples of non-ionic emulsifiers may include fatty acid alkanolamides such as coconut diethanolamide, soya diethanolamide, and/or the like.

Waxes suitable for use may include vegetable waxes such as carnauba, candelilla, and ouricury; mineral waxes such as montan, paraffin, and microcrystalline waxes; animal waxes, such as, beeswax; and/or synthetic waxes such as amide waxes and silicone waxes.

Other components that can be included may include UV absorbers such as benzotriazoles, benzophenones, and/or the like, polymeric UV absorbers having a UV chromophore attached to a polymer backbone, solvents such as mineral oil and butyl cellosolve, fragrances, colorants, preservatives, thickening agents, abrasive polishing agents such as silicas, zeolites, and the like, and neutralizing/stabilizing agents such as mineral acids or organic acids.

The automotive wax composition may be applied to a pre-wetted automobile exterior surface with a cloth, sponge or mitt. The composition can be diluted with water prior to application, if desired. After the automotive surface has been coated with the composition, the coated surface is dried and a translucent film is formed thereon. When the waxed surface is substantially dry, the waxed surface may be rinsed with water. This water rinse may substantially remove the anionic surfactant and any soil particles from the surface, as well as the formed translucent film, and may leave behind a protective film on the automotive surface. After rinsing, the automotive surface can be towel dried. A uniform and durable protective film is thus obtained, without the need for buffing or additional wiping away of excess polish generally required with conventional car wax applications.

EXAMPLES

Example 1

Experimental Details

A study was conducted to evaluate the stability of the water-based graphene dispersion using shear stabilization method according to the present disclosure.

A method for preparing the water-based graphene dispersion according to the present disclosure is described as follows: 3 g of xGnP® C-300 Graphene Nanoplatelets powder from XG Sciences and optionally 2 g of Carbopol® EZ-3 polymer from Lubrizol; 1 g of Hydrostable 212 from Momentive, and 1 g of benzisothiazolinone (BIT) preservative were added to and mixed with 993 g of deionized (DI) water to form an aqueous mixture. The aqueous mixture was further homogenized using a Gaulin homogenizer with a valve assembly as shown in FIGS. 2 and 3 under high shear pressure of 3000 psi to form an aqueous graphene dispersion. The aqueous graphene dispersion is further mixed with and neutralized by sodium hydroxide (NaOH) (a 0.001-50% active NaOH solution) to a pH value of about 6.8-7.2 to form the water-based graphene dispersion.

A further water-based graphene dispersion having a composition of 3 g of xGnP® C-300 Graphene Nanoplatelets powder, 2 g of Carbopol® EZ-3 polymer, 1 g of Hydrostable 212 and 994 g of water without the benzisothiazolinone (BIT) preservative was also prepared according to the same method of the present disclosure.

Applicant further surprisingly observed that both of the resulted water-based graphene dispersions were homogeneous and stable without visible phase separation (no settlement and no sediment) after storage at room temperature for one year.

The study results thus demonstrated that the method of the present disclosure surprisingly provides stabilization of the graphene platelet particles in the water-based graphene dispersion. The terms "stable" and "stabilization" used herein means substantially all of the graphene platelet particles are suspended without visible phase separation, e.g., not settled or sedimented, after at least one month, preferably at least two months, more preferably at least six months, most preferably at least one year, at a temperature in the range of 1° C. to about 50° C., for example, at room temperature.

Various changes and modifications to the presently preferred embodiments disclosed herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of preparing a water-based graphene dispersion using shear stabilization, the method comprising:
forming an aqueous mixture comprising water, a graphene powder, and a water dispersible rheology agent, and the aqueous mixture further comprises a surfactant that reduces surface tension of the water and selected from the group consisting of a surfactant comprising silicone, an organomodified copolymer, and mixtures thereof; and
shearing the aqueous mixture to break down the graphene powder into graphene platelet particles and to disperse the graphene platelet particles to form the water-based graphene dispersion,
wherein the graphene powder has a first number of graphene layers, the graphene platelet particles dispersed in the water-based graphene dispersion has a second number of graphene layers, and the second number is smaller than the first number.

2. The method according to claim 1, further comprising adding a base neutralizer into the aqueous mixture before, during and/or after shearing the aqueous mixture to adjust the pH value of the water-based graphene dispersion to be in a range of about 6.5-8.5.

3. The method according to claim 1, further comprising adding a base neutralizer into the aqueous mixture after shearing the aqueous mixture to adjust the pH value of the water-based graphene dispersion to be in a range of about 6.8-7.2.

4. The method according to claim 2, wherein the base neutralizer is selected from the group consisting of an alkaline chemical, an alkaline base, an amine neutralizer, sodium hydroxide (NaOH), potassium hydroxide (KOH), ammonium hydroxide ($NH_4OH$), morpholine ($O(CH_2CH_2)_2NH$), and mixtures thereof.

5. The method according to claim 1, wherein the graphene powder is an agglomerated graphene having an average particle size in a range of about 0.1-100 μm.

6. The method according to claim 5, wherein the graphene powder is selected from the group consisting of an agglomerated graphene, a chemically modified agglomerated graphene, an agglomerated graphene oxide, an agglomerated reduced graphene oxide, an expanded graphite or graphene, a thermally expanded graphite or graphene, a chemically exfoliated graphite or graphene, and mixtures thereof.

7. The method according to claim 1, wherein the graphene powder is about 0.1-10 wt. % of the water-based graphene dispersion.

8. The method according to claim 1, wherein the first number of graphene layers of the graphene powder is in a range of about 1-100, and the second number of graphene layers of the graphene platelet particles dispersed in the water-based graphene dispersion is in a range of about 1-20.

9. The method according to claim 1, wherein the graphene platelet particles dispersed in the water-based graphene dispersion have an average diameter in the lateral dimensions of about 0.1-10 μm.

10. The method according to claim 1, wherein the graphene platelet particles dispersed in the water-based graphene dispersion have an average diameter in the lateral dimensions of about 0.1-2 μm and an average surface area of about 100-800 m$^2$/g.

11. The method according to claim 1, wherein the water-based graphene dispersion is stable without visible phase separation after storage at room temperature for 1 week.

12. The method according to claim 1, wherein the surfactant comprises a blend of alcohol ethoxylate and polyalkyleneoxide silane.

13. The method according to claim 1, wherein the surfactant is about 0.05-2.0 wt. % of the water-based graphene dispersion.

14. The method according to claim 1, wherein the water dispersible rheology agent is about 0.05-4.0 wt. % of the water-based graphene dispersion.

15. The method according to claim 1, wherein the water dispersible rheology agent is selected from the group consisting of a polyacrylic acid polymer powder, a crosslinked polyacrylic acid polymer powder, a hydrophobically-modified crosslinked polyacrylic acid polymer powder, and mixtures thereof.

16. The method according to claim 2, wherein the water dispersible rheology agent forms a gel matrix when neutralized with the base neutralizer in the water-based graphene dispersion.

17. The method according to claim 1, wherein the shearing of the aqueous mixture is conducted under a pressure in a range from about 1,500 to about 6,000 psi.

18. The method according to claim 17, wherein the shearing of the aqueous mixture is conducted by directing the aqueous mixture through an annular orifice of a homogenizer and valve assembly under the pressure, the homogenizer and valve assembly including a valve and a valve seat, and the valve and valve seat are configured to fit together to form the annular orifice between the valve and the valve seat.

19. The method according to claim 17, wherein the shearing of the aqueous mixture is conducted by directing the aqueous mixture through an annular orifice of a homogenizer and valve assembly under the high pressure, the homogenizer and valve assembly including a valve, a valve seat and an impact ring, and the valve and valve seat are configured to fit together to form the annular orifice between the valve and the valve seat.

20. A water-based graphene dispersion comprising:
a water dispersible rheology agent;
water;
graphene platelet particles; and
a surfactant that reduces surface tension of the water and selected from the group consisting of a surfactant comprising silicone, an organomodified copolymer, and mixtures thereof,
wherein the graphene platelet particles have an average thickness of about 1-10 nm and are dispersed homogeneously in the water-based graphene dispersion, and the water-based graphene dispersion is stable without visible phase separation after storage at room temperature for at least 1 month.

21. The water-based graphene dispersion of claim 20, further comprising a base neutralizer.

22. A car care product comprising the water-based graphene dispersion of claim 20, the car care product further comprising at least one of anionic surfactants, cationic surfactants, non-ionic surfactants, amphoteric surfactants, non-ionic emulsifiers, UV absorbers, mineral oil, butyl cellosolve, fragrances, colorants, preservatives, thickening agents, abrasive polishing agents, neutralizing agents, or stabilizing agents.

* * * * *